United States Patent
Takahashi et al.

(10) Patent No.: US 8,710,746 B2
(45) Date of Patent: Apr. 29, 2014

(54) LIGHTING CONTROL DEVICE AND LIGHTING CONTROL METHOD

(75) Inventors: Toshiaki Takahashi, Yokosuka (JP); Yasushi Morimoto, Yokosuka (JP); Kenji Takahashi, Yokosuka (JP); Yukio Ishida, Yokosuka (JP); Hitoshi Kawano, Yokosuka (JP); Shinichi Kumashiro, Yokosuka (JP); Sayaka Kikuta, Yokosuka (JP)

(73) Assignee: Toshiba Lighting & Technology Corporation, Yokosuka-shi, Kanagawa (JP)

( * ) Notice: Subject to any disclaimer, the term of this patent is extended or adjusted under 35 U.S.C. 154(b) by 86 days.

(21) Appl. No.: 13/608,370

(22) Filed: Sep. 10, 2012

(65) Prior Publication Data

US 2013/0127346 A1 May 23, 2013

(30) Foreign Application Priority Data

Nov. 18, 2011 (JP) ................................ 2011-252328

(51) Int. Cl.
*H05B 37/02* (2006.01)
(52) U.S. Cl.
USPC ........................... 315/153; 315/149; 315/152
(58) Field of Classification Search
None
See application file for complete search history.

(56) References Cited

U.S. PATENT DOCUMENTS

| 4,449,074 A * | 5/1984 | Luchaco ..................... 315/159 |
| 4,451,763 A * | 5/1984 | Sodini ....................... 315/159 |
| 4,461,977 A * | 7/1984 | Pierpoint et al. ............. 315/159 |
| 5,656,995 A * | 8/1997 | Peters ....................... 340/541 |
| 8,497,634 B2 * | 7/2013 | Scharf ....................... 315/149 |
| 8,564,207 B2 * | 10/2013 | Van Herpen ................ 315/159 |
| 2010/0060173 A1 * | 3/2010 | Scharf ....................... 315/153 |
| 2010/0253241 A1 * | 10/2010 | Van Endert .................. 315/291 |
| 2011/0285296 A1 * | 11/2011 | VanHerpen .................. 315/159 |
| 2012/0306384 A1 * | 12/2012 | Chen ......................... 315/159 |

FOREIGN PATENT DOCUMENTS

| EP | 2313524 A2 | 4/2011 |
| EP | 2369899 A1 | 9/2011 |
| JP | 2009-266501 | 11/2009 |
| JP | 2009-266532 | 11/2009 |
| WO | 2008033029 A1 | 3/2008 |
| WO | 2009133505 A1 | 11/2009 |
| WO | 20100004590 A2 | 1/2010 |

OTHER PUBLICATIONS

Extended EP SR Feb. 14, 2013, EP App 12183452.7.

* cited by examiner

*Primary Examiner* — Crystal L Hammond
(74) *Attorney, Agent, or Firm* — Banner & Witcoff, Ltd.

(57) ABSTRACT

In the lighting control device according to the exemplary embodiment, the detection section detects the presence or absence of a person in a lighting area and a movement speed of a person, based on an image data of the lighting area that is lighted by a light source of a plurality of lighting apparatuses and is acquired from an imaging device. A decision section decides whether each of division areas is a stay area or a non-stay area based on the movement speed of a person detected by the detection section. A lighting control section performs different lighting controls on the lighting apparatus of the division area decided as the stay area by the decision section and the lighting apparatus of the division area decided as the non-stay area.

8 Claims, 8 Drawing Sheets

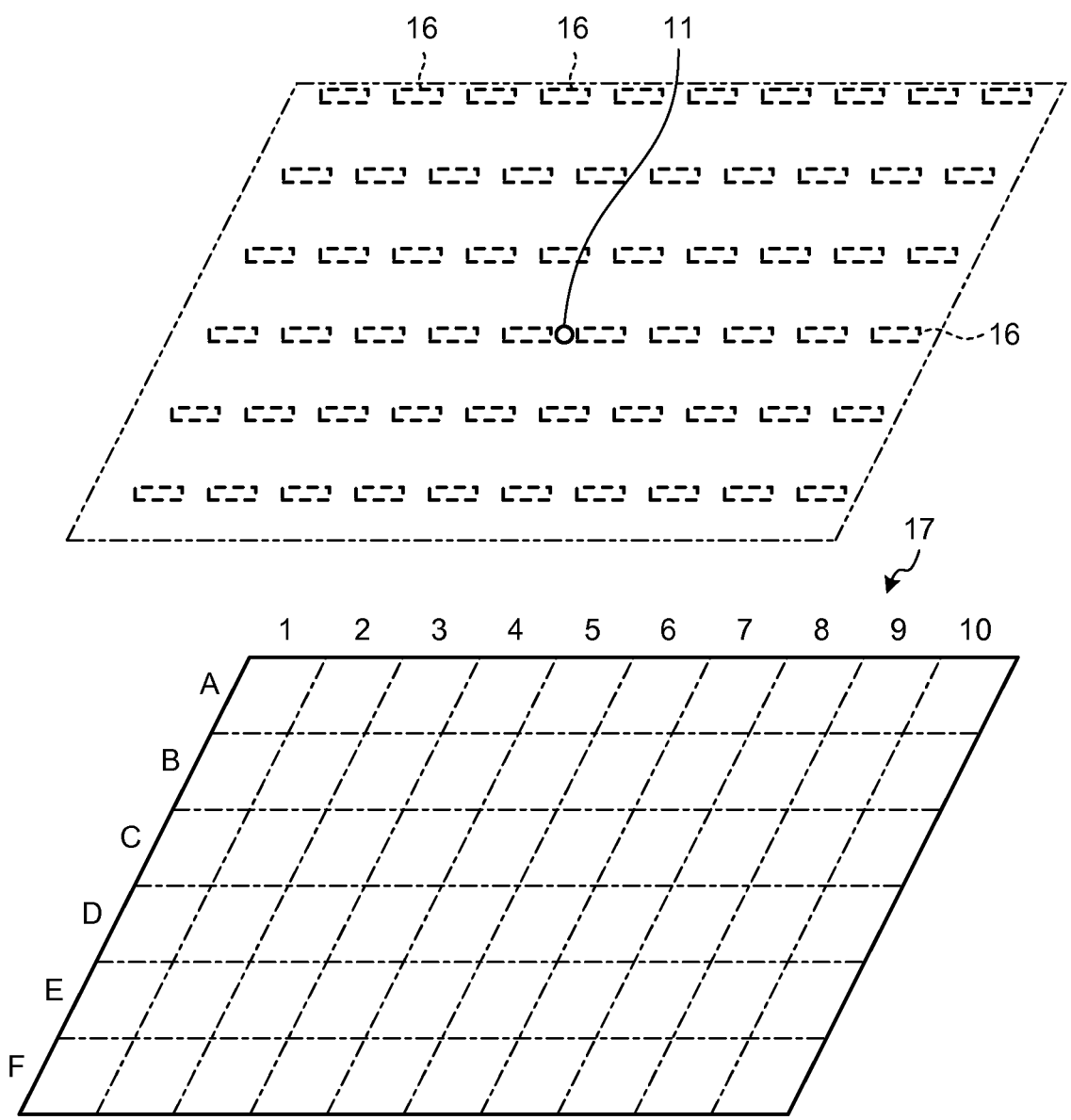

LIGHTING CONTROL DEVICE AND LIGHTING CONTROL METHOD

CROSS-REFERENCE TO RELATED APPLICATION

This application is based upon and claims priority from prior Japanese Patent Application No. 2011-252328, filed on Nov. 18, 2011, the entire contents of which are incorporated herein by reference.

FIELD

An exemplary embodiment described herein relates to a lighting control device and a lighting control method which light and control a plurality of lighting apparatuses depending on the presence or absence of a person in a lighting area which is lighted by light sources of a plurality of lighting apparatuses.

BACKGROUND

There has been a lighting control device which decides the presence or absence of a person in a lighting area which is lighted by the light source of the plurality of lighting apparatuses, and controls flashing and dimming of the lighting apparatuses depending on the decision result thereof. Image data is acquired in a room by an imaging device installed in a ceiling of a living room or the like, and the decision is performed based on the image data acquired by the imaging device.

The detection of the presence or absence of a person using the imaging device is performed, for example, by comparing two or more images imaged at certain time intervals and specifying a changed portion. Furthermore, the control of the flashing or the dimming of the lighting apparatus is, for example, to keep the lighting of the lighting apparatus for a predetermined lighting maintenance time when detecting the presence of a person, and keep a predetermined dark lighting or extinguish the lighting apparatus by gradually reducing light at a predetermined fade time by a dimming control after a lighting maintenance time elapses.

Herein, the lighting maintenance time refers to a time when the presence of a person is detected and then a lighting state of the lighting apparatus is maintained. Accordingly, when the presence of a person is newly detected within the lighting maintenance time, the lighting maintenance time is counted from that time. For that reason, when the presence of a person is continuously detected, the lighting apparatus is continuously lighted. Furthermore, fade refers to gradually changing luminance of the lighting apparatus, and the fade time refers to a time from a normal lighting state of the lighting apparatus to a predetermined dark lighting or the extinguishing. In the related art, the lighting maintenance time or the fade time are uniformly set in the same lighting area.

However, in the same lighting area, when the lighting maintenance time or the fade time is uniformly set, in an area where a person always present and an area where a person is temporarily present, the lighting control using the same lighting maintenance time or the fade time is performed. Such a control is not preferable from the viewpoint of energy conservation.

Thus, although dividing the lighting area into a plurality of division areas and manually setting the lighting maintenance time or the fade time for each division area is considered, when doing so, a lot of time is spent for the setting task.

An object of an exemplary embodiment is to provide a lighting control device and a lighting control method which are able to decide whether each of division areas into which the lighting area is divided is a stay area where a person stays or a non-stay area where a person does not stay, and perform different lighting controls for each determined area.

DESCRIPTION OF THE DRAWINGS

FIG. 2 is an explanatory diagram of a lighting area to which the lighting control device according to an exemplary embodiment is applied.

DETAILED DESCRIPTION

Figure 1:
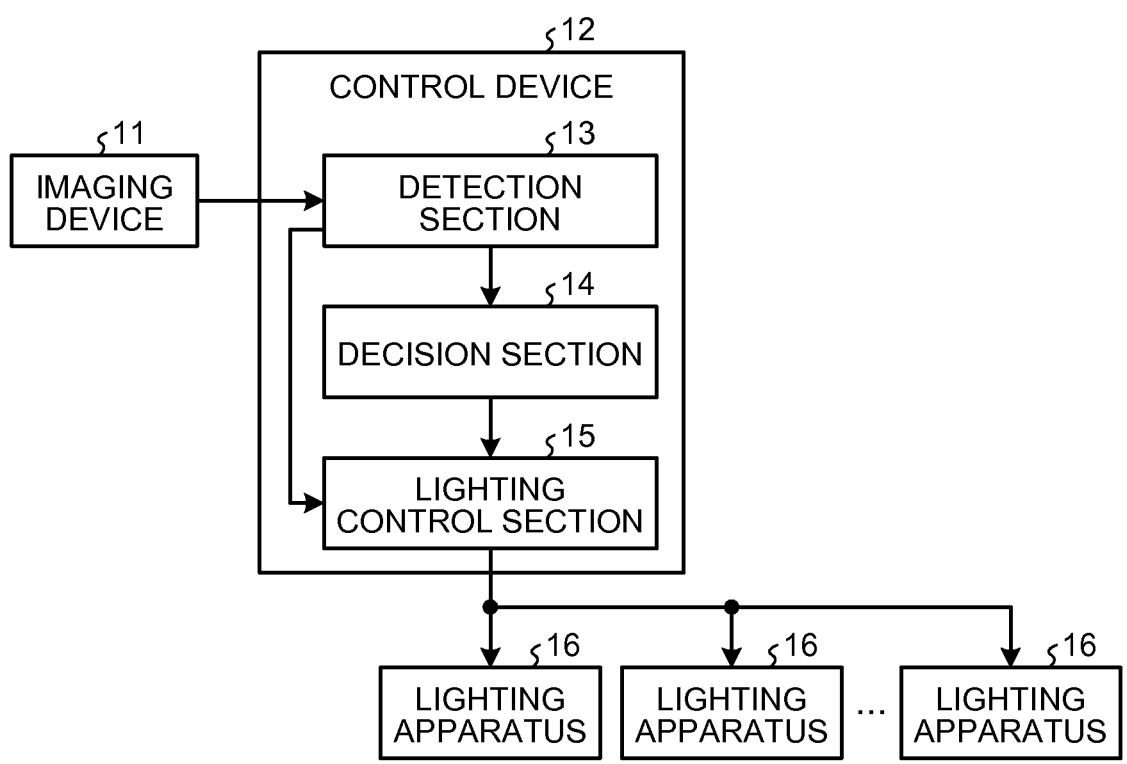
FIG. 1 is a configuration diagram of a first example of a lighting control device according to an exemplary embodiment.

Hereinafter, exemplary embodiments will be described. FIG. 1 is a configuration diagram of a first example of a lighting control device according to an exemplary embodiment. An imaging device 11 is configured so as to obtain an image data of a lighting area lighted by light sources of a plurality of lighting apparatuses at a predetermined period in a time series manner. The imaging device 11 is integrally constituted by including a solid-state imaging device such as a CCD (Charge Coupled Device) or a CMOS (Complementary Metal Oxide Semiconductor), an optical lens, and a signal processing circuit. The imaging device 11 is, for example, placed in a ceiling of an indoor, a wall surface or the like, sequentially images the indoor in a time series manner, acquires an image data of the time series, and sends the image data to a control device 12.

The optical lens used in the imaging device 11 is, for example, a wide-angle lens or a fisheye lens, and a wide range of the indoor can be imaged using the wide-angle lens or the fisheye lens. Furthermore, the solid-state imaging device may be a color purpose or a monochrome purpose, and is desired to have sensitivity up to an infrared area. Such a condition is for the purpose of allowing the discrimination of the movement of a person even when the lighting apparatus is turned off.

For example, the control device is realized by a computer such as a micom (microcomputer). In FIG. 1, a calculation processing function of the control device is shown by a block. An image data of a time series from the imaging device 11 is input to a detection section 13 of the control device 12. The detection section 13 detects presence or absence of a person and a movement speed of a person, based on the image data of the time series acquired by the imaging device 11.

The detection section 13, for example, compares the image data acquired before one period to the image data acquired in the present period, specifies a changed portion in the image data, and sets the image data change portion as human body information. That is, the detection section 13 determines the presence or absence of a person by a moving line (a trace) of the image data change portion or a movement distance. Furthermore, the detection section 13 detects the movement speed of a person by the movement speed of the image data change portion.

A decision section 14 divides the lighting area into a plurality of division areas, and decides whether each division area is a stay area where a person stays or a non-stay area where a person does not stay based on the movement speed of a person of the lighting area detected by the detection section 13. The decision result of the decision section 14 is output to the lighting control section 15. For example, when the presence of a human is continuously detected in one division area, the decision section 14 determines that a person stays in the division area, and decides the division area as the stay area. Meanwhile, if the change portion of the image data is moved in a predetermined direction over a plurality of division areas, the decision section 14 decides that the human body is moved, and decides the division areas as the non-stay area.

When the presence of a person is detected by the detection section 13, the lighting control section 15 performs the lighting control of the division area where a person is detected. At that time, the lighting control section 15 performs the different lighting controls of the lighting apparatuses 16 placed in the division areas in the division area decided as the stay area and the division area decided as the non-stay area, based on the decision result of the decision section 14. The lighting control section 15 lengthens the lighting maintenance time of the lighting apparatus 16 or increases the luminance of the lighting apparatus 16, for example, in the stay area. Meanwhile, the lighting control section 15 shortens the lighting maintenance time of the lighting apparatus 16 or decreases the luminance of the lighting apparatus in the non-stay area.

FIG. 2 is an explanatory diagram of the lighting area to which the lighting control device according to an exemplary embodiment is applied. FIG. 2 shows a lighting area 17 including a passage and an office. In the ceiling of the lighting area 17, a plurality of lighting apparatuses 16 and imaging devices 11 are placed. The plurality of lighting apparatuses 16 lights the lighting area 17, and the imaging device 11 acquires the image data of the lighting area 17 that is lighted by the light source of the plurality of lighting apparatuses 16.

The lighting area 17 is conveniently divided into a plurality of areas in advance, and a plurality of division areas is defined. The division areas are unit areas where the decision section 14 decides the stay area or the non-stay area. FIG. 2 shows a situation where 60 division areas of 6 rows (A to F) and 10 columns (1 to 10) are divided.

Figure 3A:
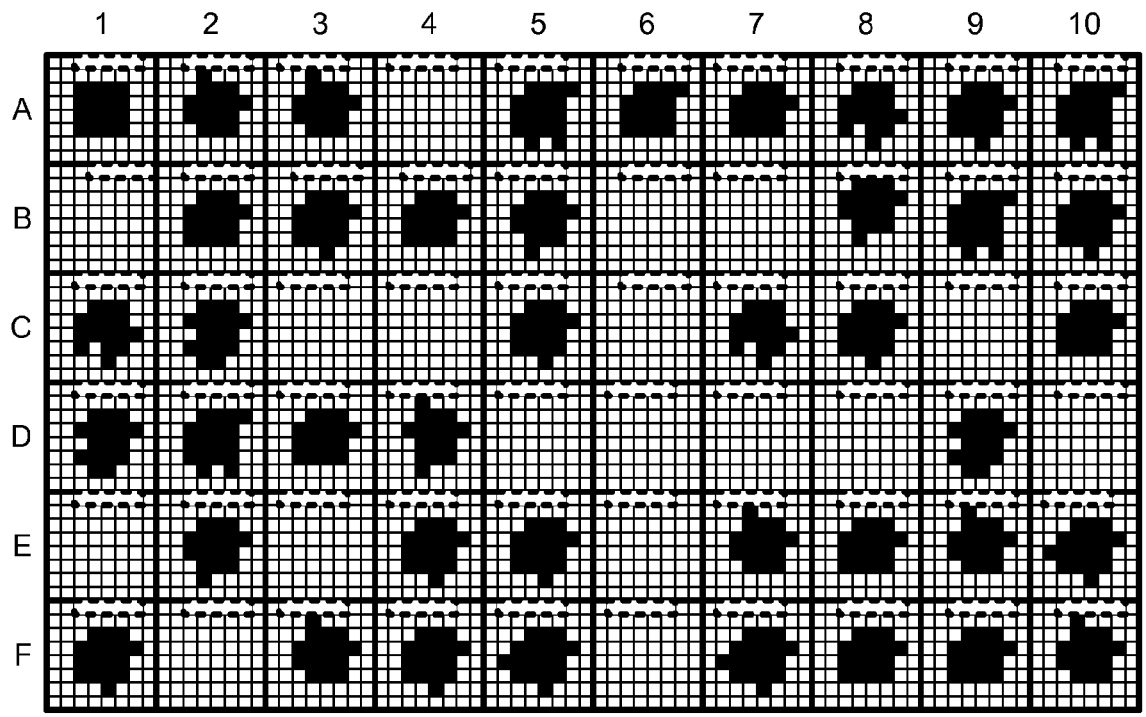
FIG. 3A is a plan view that shows an example of a time series image data of the lighting area.

FIG. 3 is a plan view that shows an example of a time series image data of the lighting area, and shows a situation where the time elapses in the sequence of FIGS. 3A to 3F. For the purpose of simplicity, the description will be made hereinafter assuming that a black crushing portion is an object corresponding to a person. The lighting area 17 is an area that includes the passage and the office. The office is an area having a high probability that a person always stays, and the passage is an area having a high probability that a person intermittently stays. FIG. 3A is an image data of the lighting area 17 acquired at the first period, and in the division areas (A, 4), (B, 1), (B, 6), (B, 7), (C, 3), (C, 4), (C, 6), (C, 9), (D, 5) to (D, 8), (D, 10), (E, 1), (E, 3), (E, 6), (F, 2) and (F, 6), an object, which can be assumed as a person, does not present.

Figure 3B:
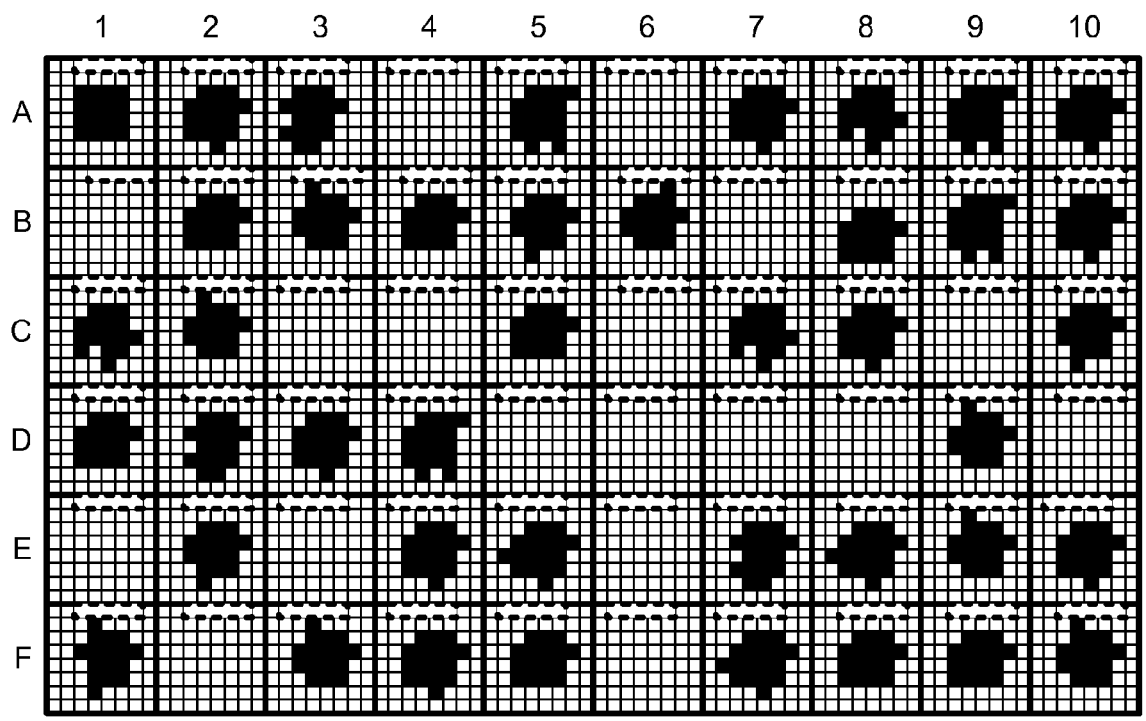
FIG. 3B is a plan view that shows a time series image data following the time series image data shown in FIG. 3A.

FIG. 3B is an image data of the lighting area 17 acquired at a second period. When comparing the image data of FIG. 3B acquired at the current period to the image data of FIG. 3A acquired at the preceding period, it is understood that there is no object which can be assumed as a person from the division area (A, 6), but an object, which can be newly assumed as a person, is present in the division area (B, 6). In other division areas, there is no increase or decrease of an object that can be assumed as a person. Furthermore, in the division areas (A, 1), (A, 5), (A, 8), (B, 2), (B, 4), (B, 5), (B, 9), (B, 10), (C, 1), (C, 7), (C, 8), (E, 2) to (E, 4), (E, 9), (F, 3), (F, 4) and (F, 7) to (F, 10) among the division areas where an object which can be assumed as a person is present, there is no change in movement of an object which can be assumed as a person, and in the remaining division areas where an object which can be assumed as a person is present, there is a movement of an object which can be assumed as a person.

Figure 3C:
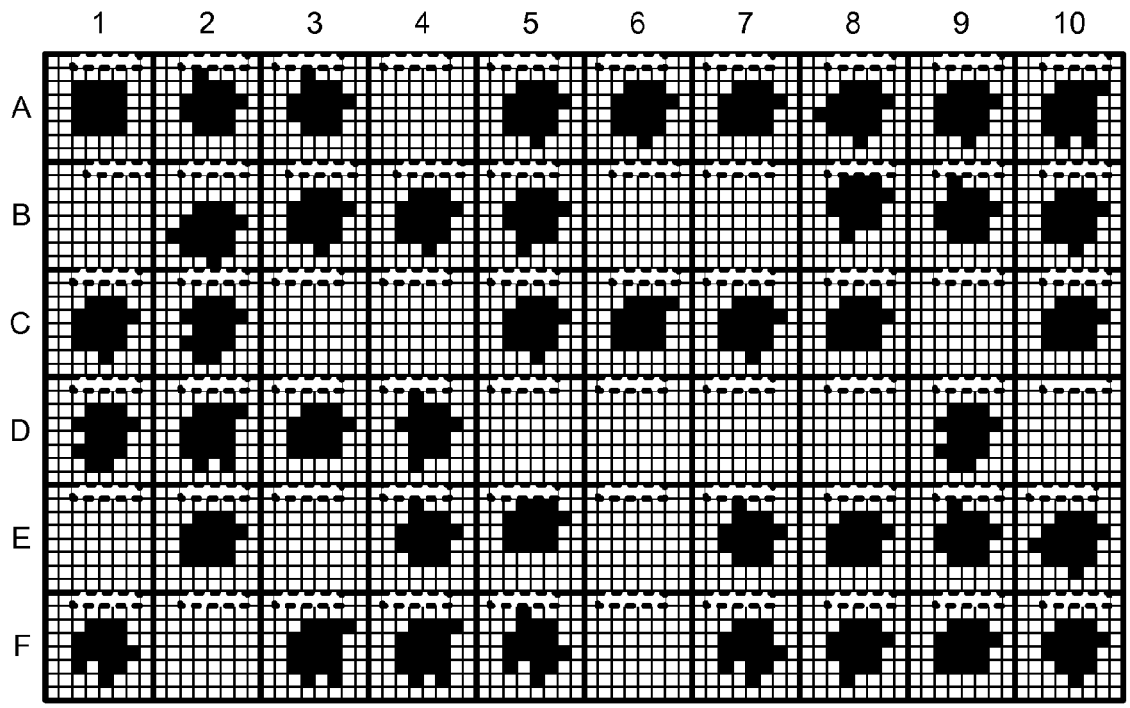
FIG. 3C is a plan view that shows a time series image data following the time series image data shown in FIG. 3B.

FIG. 3C is an image data of the lighting area 17 acquired at a third period. When comparing the image data of FIG. 3C acquired at the current period to the image data of FIG. 3B acquired at the preceding period, it is understood that there is an object which can be newly assumed as a person in the division area (A, 6), there is no object which can be newly assumed as a person from the division area (B, 6), and there is an object which can be newly assumed as a person in the division area (C, 6). In other division areas, there is no increase or decrease of an object that can be assumed as a person. Furthermore, in the division areas (A, 1), (B, 5), and (B, 10), among the division areas where there is no movement of an object which can be assumed as a person, there is no movement even in the image data of the lighting area 17 acquired at the third period.

Figure 3D:
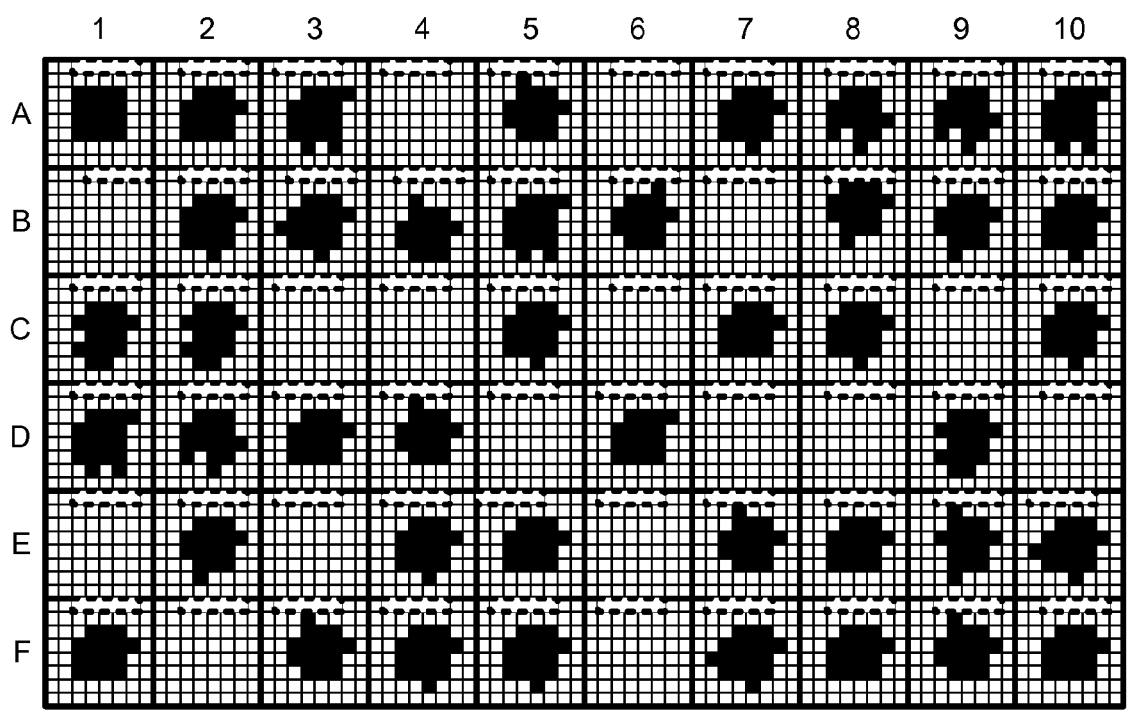
FIG. 3D is a plan view that shows a time series image data following the time series image data shown in FIG. 3C.

FIG. 3D is an image data of the lighting area 17 acquired at a fourth period. When comparing the image data of FIG. 3D acquired at the current period to the image data of FIG. 3C acquired at the preceding period, it is understood that there is no object which can be assumed as a person from the division areas (A, 6) and (C, 6), and there is an object which can be newly assumed as a person in the division areas (B, 6) and (D, 6). In other division areas, there is no increase or decrease of an object that can be assumed as a person. Furthermore, in the division area (A, 1) among the division areas where there is no movement of an object which can be assumed as a person, there is no movement even in the image data of the lighting area 17 acquired at the fourth period.

Figure 3E:
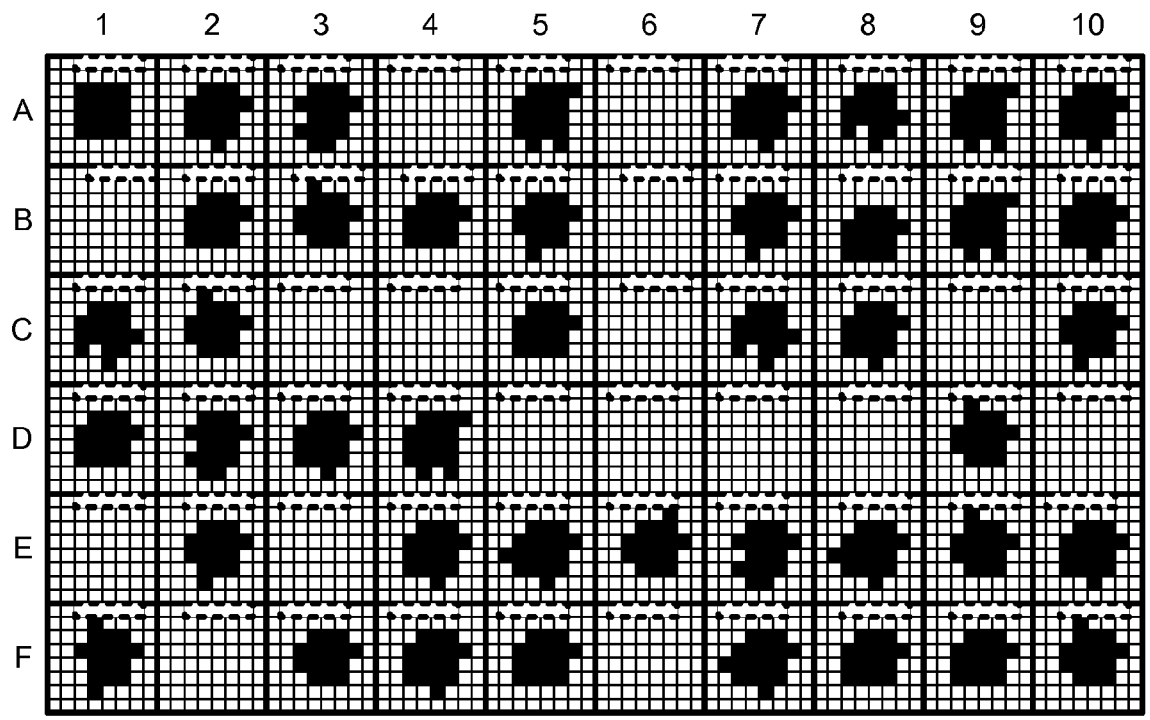
FIG. 3E is a plan view that shows a time series image data following the time series image data shown in FIG. 3D.

FIG. 3E is an image data of the lighting area 17 acquired at a fifth period. When comparing the image data of FIG. 3E acquired at the current period to the image data of FIG. 3D acquired at the preceding period, it is understood that there is no object which can be assumed as a person from the division areas (B, 6) and (D, 6), and there is an object which can be newly assumed as a person in the division areas (B, 7) and (E, 6). In other division areas, there is no increase or decrease of an object that can be assumed as a person. Furthermore, in the division area (A, 1) among the division areas where there is no movement of an object which can be assumed as a person, there is no movement even in the image data of the lighting area 17 acquired at the fifth period.

Figure 3F:
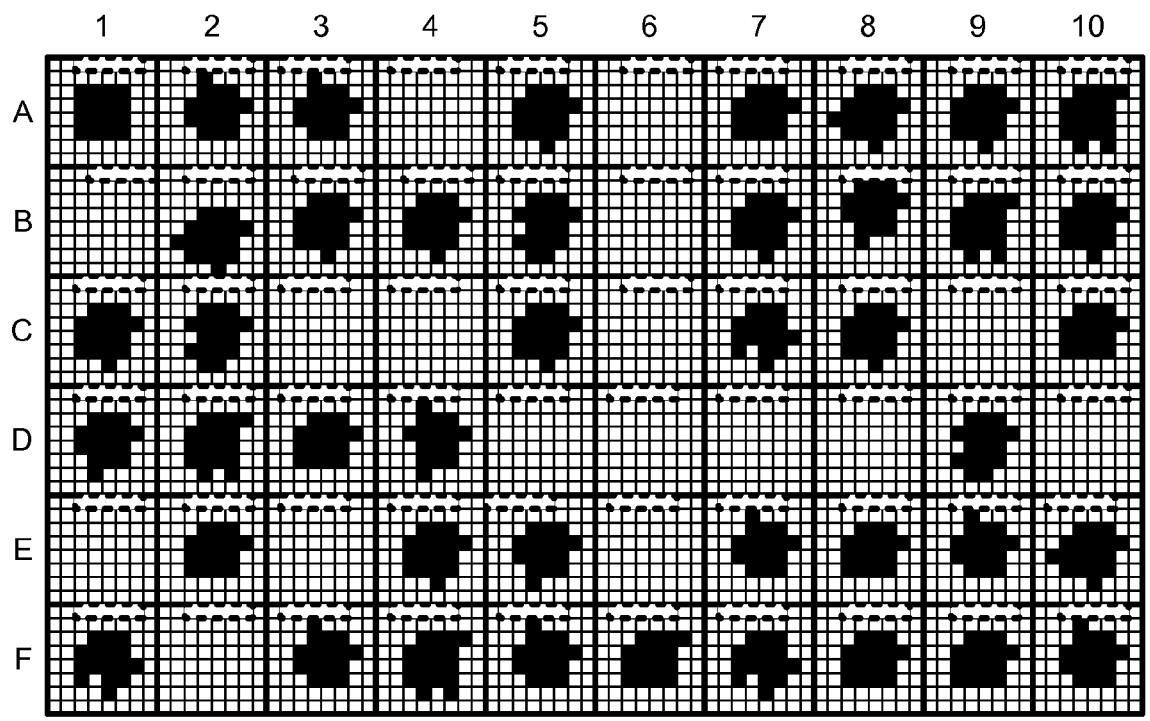
FIG. 3F is a plan view that shows a time series image data following the time series image data shown in FIG. 3E.

FIG. 3F is an image data of the lighting area 17 acquired at a sixth period. When comparing the image data of FIG. 3F acquired at the current period to the image data of FIG. 3E acquired at the preceding period, it is understood that there is no object which can be assumed as a person from the division area (E, 6), and there is an object which can be newly assumed as a person in the division area (F, 6). In other division areas, there is no increase or decrease of an object that can be assumed as a person. Furthermore, in the division area (A, 1) among the division areas where there is no movement of an object which can be assumed as a person, there is no movement even in the image data of the lighting area 17 acquired at the sixth period.

The detection section 13 determines the presence or the absence of a person by a moving line (a trace) and a movement distance of the image data change portion based on the image data of the time series of the lighting area 17. Now, a division area A2 of the image data of FIGS. 3A to 4F is noticed. In the division area (A, 2), an object which can be assumed as a person is always present. Moreover, when comparing the image data of FIG. 3A to the image data of FIG. 3B, there is a movement of an object that can be assumed as a person. Accordingly, an object in the division area (A, 2) is decided as a person.

Furthermore, when noticing the division areas (A, 6) to (F, 6) of the image data of FIG. 3A to 3F, in the image data of FIG. 3A, there is an object that can be assumed as a person in the division area (A, 6), and there is no object that can be assumed as a person in the division area (B, 6). On the contrary, in the image data of FIG. 3B, there is an object that can be assumed as a person in the division area (B, 6), and there is no object that can be assumed as a person in the division area (A, 6). Thus, it is considered that an object which can be assumed as a person is moved from the division area (A, 6) to the division area (B, 6). Furthermore, when comparing the division area (A, 6) of the image data of FIG. 3A to the division area (B, 6) of the image data of FIG. 3B, it is understood that there is a movement of an object that can be assumed as a person. Thus, it is determined that an object moved from the division area (A, 6) to the division area (B, 6) is a person.

Under the circumstance, a time when the person is moved from the division area (A, 6) to the division area (B, 6) in the lighting area 17 is a time of one period and the movement distance is one division area, and thus, the movement speed of a person of that time is detected therefrom.

The decision section 14 decides whether each division area divided from the lighting area 17 into a plurality of areas in advance is the stay area where a person stays or the non-stay area where a person does not stay, based on the movement speed of a person of the lighting area 17 detected by the detection section 13. That is, since the movement speed of a person is high in the division areas (A, 6) to (F, 6), the decision section 14 decides the division areas (A, 6) to (F, 6) as the non-stay areas (passages). Meanwhile, in the areas other than the division areas (A, 6) to (F, 6), for example, in the division area (A, 2), there is a movement of a person, but the movement distance or the movement speed is not great, and thus, the decision section 14 decides the areas other than the division areas (A, 6) to (F, 6) as the stay area (the office).

The lighting control device 15 performs the lighting control which lengthens the lighting maintenance time of the lighting apparatus 16 in the stay area, and shortens the lighting maintenance time of the lighting apparatus 16 in the non-stay area. In the non-stay area, a person merely and temporarily passes, and thus, the lighting maintenance time of the lighting apparatus 16 is shortened. As a result, the energy conservation is promoted.

FIG. 4 is an explanatory diagram of the lighting control contents using the lighting control device 15. FIG. 4A is an explanatory diagram of the lighting control contents of the lighting apparatus placed in the division area decided as the stay area by the decision section 14. When a person is detected at a time t0, the lighting control section 15 lights the lighting apparatus 16 of the division area that is the stay area. Under the circumstance, the lighting control section 15 maintains the lighting state as much as a predetermined lighting maintenance time T1, when a person is not detected at in the time t1 becoming the lighting maintenance time T1, light is gradually reduced at a predetermined fade time T2, and after the time t2 becoming a non-dimming degree, the dark lighting is maintained in the non-diming degree. In addition, instead of maintaining the dark lighting in the non-dimming degree, the lighting apparatus 16 may be lighted out.

Figure 4A:
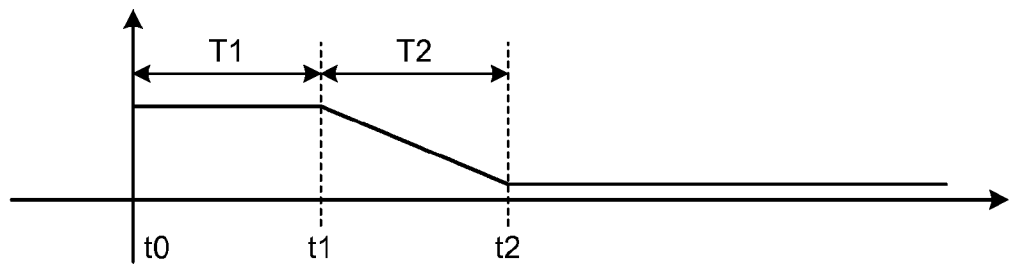
FIG. 4A is an explanatory diagram of lighting control contents of a lighting apparatus placed in a division area determined as a stay area.
Figure 4B:
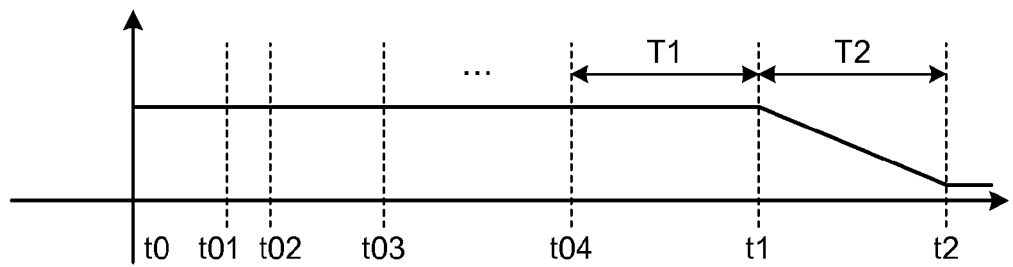
FIG. 4B is an explanatory diagram of the lighting control contents when a person is detected while the lighting maintenance time T1 of FIG. 4A continues.

FIG. 4B is an explanatory diagram of the lighting control contents when a person is detected while continuing the lighting maintenance time T1 of FIG. 4A. When a person is detected at the time t0, the lighting control section 15 lights on the lighting apparatus 16 of the division area corresponding to the stay area. At the times t01, t02 and t03, when a person is detected, the lighting control section 15 newly starts to count the lighting maintenance time T1 from the times t01, t02 and t03 when a person is newly detected. Herein, a time interval between the adjacent timings in the times t0, t01, t02, t03 and t04 is shorter than the lighting maintenance time T1. Accordingly, when a person is newly detected while continuing the lighting maintenance time T1, the lighting apparatus continues the lighting. Moreover, when a person is not detected while the lighting maintenance time T1 after the lighting maintenance time T1 is started to count at the time t04, the lighting control section 15 gradually reduces light at a predetermined fade time T2, and after the time t2 becoming the non-dimming degree, the dark lighting is maintained in the non-dimming degree. Under the circumstance, instead of maintaining the dark lighting in the non-dimming degree, the lighting apparatus 16 may also be lighted out.

Figure 4C:
FIG. 4C is an explanatory diagram of lighting control contents of a lighting apparatus placed in a division area determined as a non-stay area.

Next, FIG. 4C is an explanatory diagram of the lighting control contents of the lighting apparatus placed in the division area decided as the non-stay area by the decision section 14. When a person is detected at the time t0, the lighting control section 15 lights on the lighting apparatus 16 of the division area decided as the non-stay area. Under the circumstance, the lighting control section 15 continues the lighting state as much as a lighting maintenance time T3 that is set to be shorter than the time T1, when a person is not detected at the time t1 becoming the lighting maintenance time T3, light is gradually reduced at a fade time T4 that is set to be shorter than the time T2, and after the time t2 becoming a non-dimming degree, the dark lighting is maintained in the non-diming degree. In addition, instead of maintaining the dark lighting in the non-dimming degree, the lighting apparatus 16 may be lighted out.

Figure 4D:
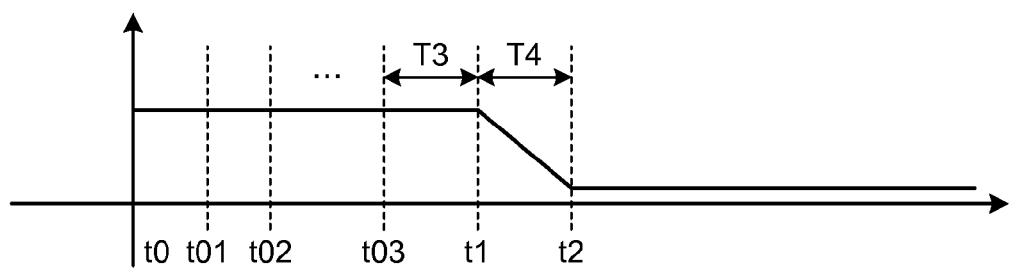
FIG. 4D is an explanatory diagram of the lighting control contents when a person is detected while the lighting maintenance time T3 of FIG. 4C continues.

FIG. 4D is an explanatory diagram of the lighting control contents when a person is detected while continuing the lighting maintenance time T3 of FIG. 4C. When a person is detected at the time t0, the lighting control section 15 lights on the lighting apparatus 16 of the division area corresponding to the non-stay area. Furthermore, when a person is detected at the times t01, and t02, the lighting control section 15 starts to count the lighting maintenance time T3 from the times t01 and t02 and continues the lighting of the lighting apparatus. Furthermore, when a person is not detected while the lighting maintenance time T3 after the lighting maintenance time T3 starts to count at the time t03, the lighting control section 15 gradually reduces light at a predetermined fade time T4 set in advance, and after the time t2 becoming the non-dimming degree, the dark lighting is maintained in the non-dimming degree. Furthermore, under the circumstance, instead of maintaining the dark lighting in the non-dimming degree, the lighting apparatus 16 may also be lighted out.

In the description mentioned above, the lighting maintenance time of the lighting apparatus was lengthened in the stay area, and the lighting maintenance time of the lighting apparatus was shortened in the non-stay area. However, the luminance of the lighting apparatus may be increased in the stay area, and the luminance of the lighting apparatus may be decreased in the non-stay area. Otherwise, the length of the lighting maintenance time may be combined with the luminance intensity.

According to a first example according to an exemplary embodiment, a person is detected from the image data of the lighting area, and for each detection thereof, it is decided whether there is a stay area such as an office where a person stays or a non-stay area such as a passage where a person does not stay based on the movement speed of the detected person. As a result, even when replacing the arrangement of the office, it is possible to suitably discriminate the stay area and the non-stay area. Furthermore, when a person is detected, the fade time up to the lighting maintenance time of the lighting apparatus or the non-dimming degree is adjusted depending on the stay area or the non-stay area. As a result, the unnecessary lighting maintenance time can be reduced and the energy conservation is promoted.

Figure 5:
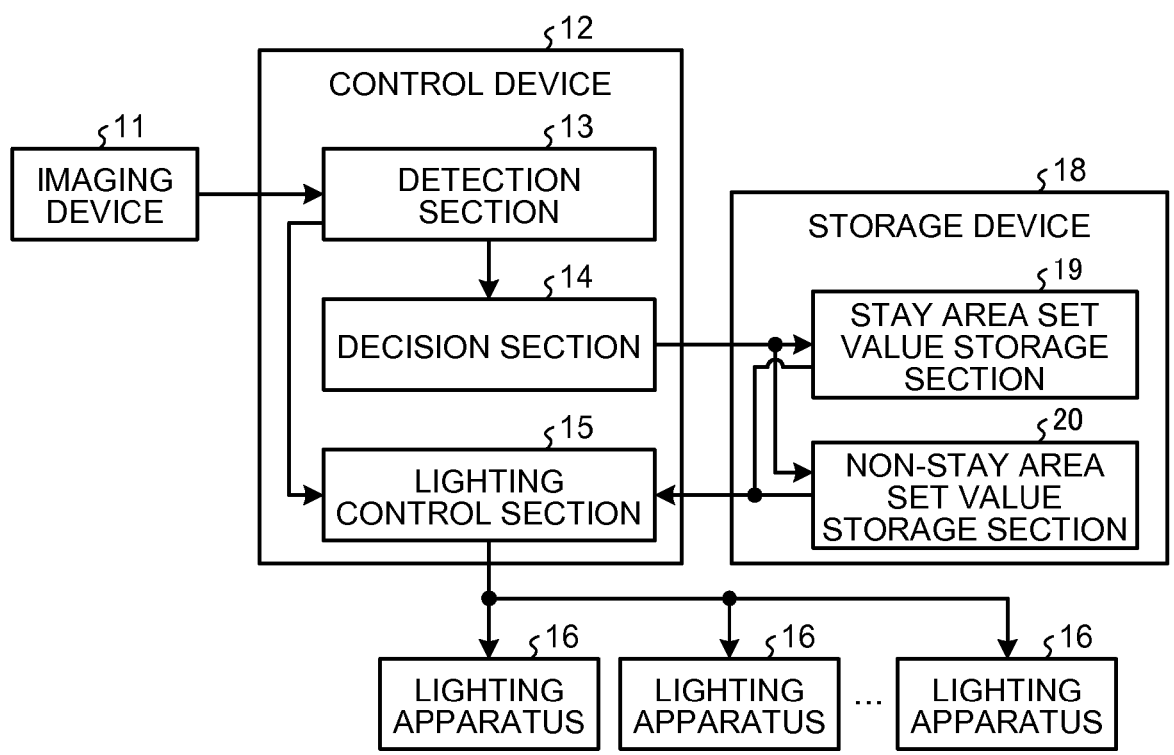
FIG. 5 is a configuration diagram of a second example of a lighting control device according to an exemplary embodiment.

Next, another example of a lighting control device according to an exemplary embodiment will be described. FIG. 5 is a configuration diagram of a second example of a lighting control device according to an exemplary embodiment. Compared to the first example shown in FIG. 1, in the second example, a storage device 18 is provided with a stay area set value storage section 19 and a non-stay area set value storage section 20. Moreover, a set value showing that whether the division area is the stay area or the non-stay area based on the decision result decided by the decision section 14 is stored in the storage device 18. Moreover, the lighting control section 15 performs the lighting control of the lighting apparatus 16 based on the set value stored in the storage device 18.

That is, in the first example shown in FIG. 1, whenever the decision result is obtained by the decision section 14, the different lighting controls are performed in the lighting apparatus 16 of the stay area and the lighting apparatus 16 of the non-stay area. On the contrary, in the second example, it is discriminated whether the division area is the stay area such as the office where a person stays or the non-stay area such as the passage where a person does not stay, by the stay area set value and the non-stay area set value stored in the storage device 18. The same elements as those of FIG. 1 are denoted by the same reference numerals and the repeated descriptions will be omitted.

Similarly to the first example, in the decision section 14, based on the movement speed of a person of the lighting area detected by the detection section 13, it is decided whether each of division areas into which the lighting area is divided in advance is the stay area where a person stays or the non-stay area where a person does not stay, and the decision result is stored in the storage device 18 as the set value. That is, the decision section 14 stores the division area decided as the stay area in the stay area set value storage section 19, and stores the division area decided as the non-stay area in the non-stay area set value storage section 20. Moreover, the decision section 14 firstly decides whether the division area is the stay area or the non-stay area, and the decision result is stored as the set value and is used as an initial value. In addition, a preset value may be set as an initial value, without using the decision result.

When a person is detected by the detection section 13, the lighting control section 15 decides whether the division area, where a person is detected, is the stay area or the non-stay area, with reference to the stay area set value stored in the stay area set value storage section 19 of the storage device 18 and the non-stay area set value stored in the non-stay area set value storage section 20. Moreover, the lighting control section 15 performs the different lighting controls of the lighting apparatus 16 of the division area decided as the stay area and the lighting apparatus 16 of the division area decided as the non-stay area. For example, the lighting control section 15 lengthens the lighting maintenance time of the lighting apparatus 16 or increases the luminance of the lighting apparatus 16 in the stay area. Meanwhile, the lighting control section 15 shortens the lighting maintenance time of the lighting apparatus 16 or reduces the luminance of the lighting apparatus in the non-stay area. In addition, after the decision result of the stay area or the non-stay area is accumulated to a certain degree, the renewal of the stay area set value and the non-stay area set value may be performed. For example, when the non-stay area is decided for a predetermined time or a predetermined number in the division area stored as the stay area, the division area is stored as the non-stay area. Otherwise, when the stay area is decided for a predetermined time or a predetermined number in the division area stored as the non-stay area, the division area is stored as the stay area.

According to a second example of an exemplary embodiment, the stay area or the non-stay area is decided with reference to the stay area set value and the non-stay area set value stored in the storage device 18. As a result, the decision of the stay area or the non-stay area is easily performed, and the control can be stably performed without an accidental movement of a worker.

Figure 6:
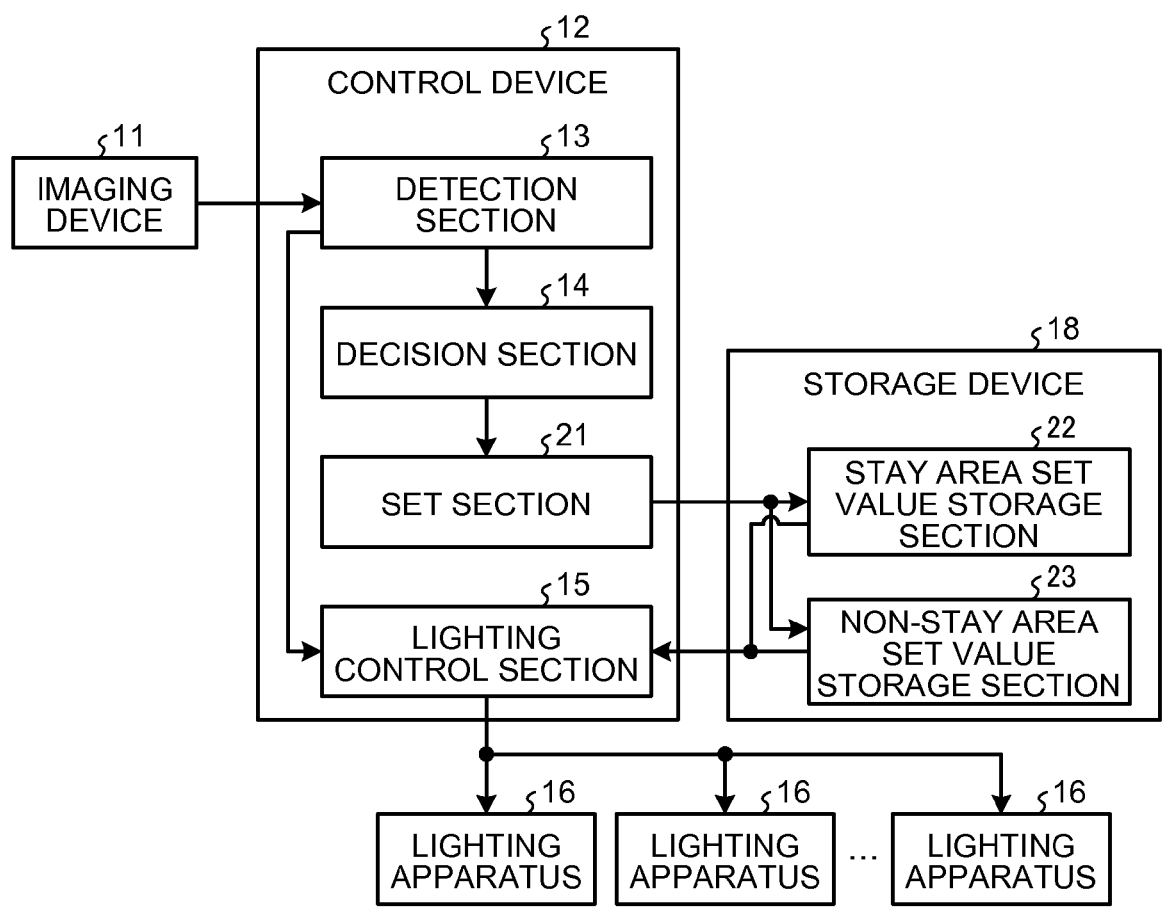
FIG. 6 is a configuration diagram of a third example of a lighting control device according to an exemplary embodiment.

FIG. 6 is a configuration diagram of a third example of a lighting control device according to the exemplary embodiment. Compared to the first example shown in FIG. 2, in the third example, the stay area is stored in the storage device 18 as an initial set value in the entire division areas of the lighting area. Moreover, in the division area where the set section 21 decides as the non-stay area, the non-stay area is set instead of the stay area. The same elements as those of FIG. 6 are denoted by the same reference numerals and the repeated descriptions will be omitted.

The storage device 18 is provided with a stay area storage section 22 and a non-stay area storage section 23. The division area of the stay area is stored in the stay area storage section 22, and the division area of the non-stay area is stored in the non-stay area storage section 23. In the stay area storage section 22, as the initial value, the entire division areas of the lighting area are stored in advance. Furthermore, the set section 21 sets the division area where the decision result of the decision section 14 is decided as the non-stay area, as the non-stay area.

That is, the set section 21 decides whether or not the number decided as the non-stay area in a predetermined time is equal to or greater than a predetermined number in the division area where the decision result of the decision section 14 is decided as the non-stay area, and when the number is equal to or greater than a predetermined number, the division area is renewed and stored in the non-stay area storage section 23 of the storage device 18 as the non-stay area.

The predetermined time is, for example, about a time of a week or a month. Furthermore, the predetermined number may be a value depending on the ratio of the number decided as the stay area to the number decided as the non-stay area, by the decision section 14. For example, when the ratio of the number decided as the stay area to the number decided as the non-stay area is 100%, the predetermined number is 10 times, when the ratio is 90%, the predetermined number is 20 times, and when the ratio is 80%, the predetermined number is 40 times. In this manner, the smaller the ratio is, the greater the predetermined number is. Moreover, when the ratio is equal to or less than 50%, the non-stay area may be not set. That is, it is decided whether or not the number decided as the non-stay area is equal to or greater than the predetermined number with respect to the decision number of the decision section 14 in a predetermined time, and when the number is equal to or greater than a predetermined number, the division area is renewed and stored in the storage device as the non-stay area.

Furthermore, even if once the division area is set as the non-stay area, when the ratio thereof is equal to or less than 50%, the setting of the non-stay area from the non-stay area storage section 23 is deleted, is renewed and stored in the stay area storage section 22 as the stay area, and returns to an original state.

According to the third example according to the exemplary embodiment, when the entire division areas are stored as the stay area as the initial set value, the set section 21 sets the non-stay area. As a result, even if the arrangement replacement of the office is performed, it is possible to set the stay area and the non-stay area according to the real circumstances.

Although the exemplary embodiments have been described as mentioned above, the exemplary embodiments are present as an example but are not intended to limit the scope thereof. The new exemplary embodiments can be carried out by various other forms, and various omissions, replacements and alterations can be performed without departing from the gist thereof. The exemplary embodiments and the modifications thereof are included in the scope and gist thereof, and are included in the description of the claims and equivalents thereof.

What is claimed is:

1. A lighting control device comprising:
   a detection section configured to detect the presence or absence of a person in a lighting area and a movement speed of a person, based on an image data of the lighting area that is lighted by light sources of a plurality of lighting apparatuses and is acquired from an imaging device;
   a decision section configured to decide whether each of division areas into which the lighting area is divided in advance is a stay area where a person stays or a non-stay area where a person does not stay, based on the movement speed detected by the detection section; and
   a lighting control section configured to perform different lighting controls on the lighting apparatus of the division area decided as the stay area by the decision section and the lighting apparatus of the division area decided as the non-stay area.

2. The lighting control device according to claim 1, further comprising:
   a storage device configured to store a set value indicating whether each of the division areas is the stay area or the non-stay area, based on the decision result in the decision section,
   wherein the lighting control section is configured to perform the lighting control of the lighting apparatus based on the set value that is stored in the storage device.

3. The lighting control device according to claim 2,
   wherein, in the storage device, initial set values of the division areas are set values indicating the stay area, and
   the lighting control device further includes a set section which decides whether or not the number decided as the non-stay area by the decision section in a predetermined time is equal to or greater than a predetermined number in regard to each of the division areas, and renews the set value of the division area decided to be equal to or greater than the predetermined number by a set value indicating the non-stay area.

4. The lighting control device according to claim 3,
   wherein the predetermined number differs depending on a ratio of the number decided as the stay area by the decision section to the number decided as the non-stay area by the decision section, in regard to each of the division areas.

5. The lighting control device according to claim 1,
   wherein, if the presence of a person is detected by the detection section, the decision section decides whether each of the division areas is the stay area or the non-stay area.

6. The lighting control device according to claim 1,
   wherein the lighting control section lengthens a lighting maintenance time of the lighting apparatus of the division area decided as the stay area by the decision section, and shortens a lighting maintenance time of the lighting apparatus of the division area decided as the non-stay area by the decision section.

7. The device according to claim 1,
   wherein the lighting control section is configured to raise luminance of the lighting apparatus of the division area decided as the stay area by the decision section, and lower luminance of the lighting apparatus of the division area decided as the non-stay area by the decision section.

8. A lighting control method comprising:
   detecting the presence or absence of a person in a lighting area and a movement speed of a person, based on an image data of the lighting area that is lighted by light sources of a plurality of lighting apparatuses and is acquired from an imaging device;
   deciding whether each of division areas into which the lighting area is divided in advance is a stay area where a person stays or a non-stay area where a person does not stay, based on the detected movement speed; and
   performing different lighting controls on the lighting apparatus of the division area decided as the stay area and the lighting apparatus of the division area decided as the non-stay area.

* * * * *